No. 853,515. PATENTED MAY 14, 1907.
P. F. LYONS.
FLEXIBLE CONNECTION FOR WATER CLOSETS, &c.
APPLICATION FILED NOV. 29, 1904.
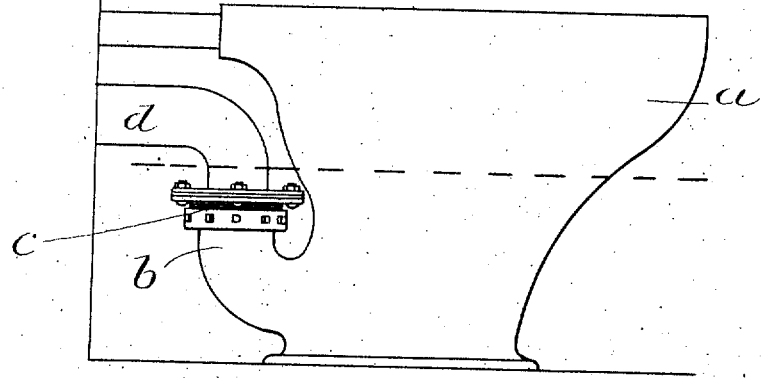
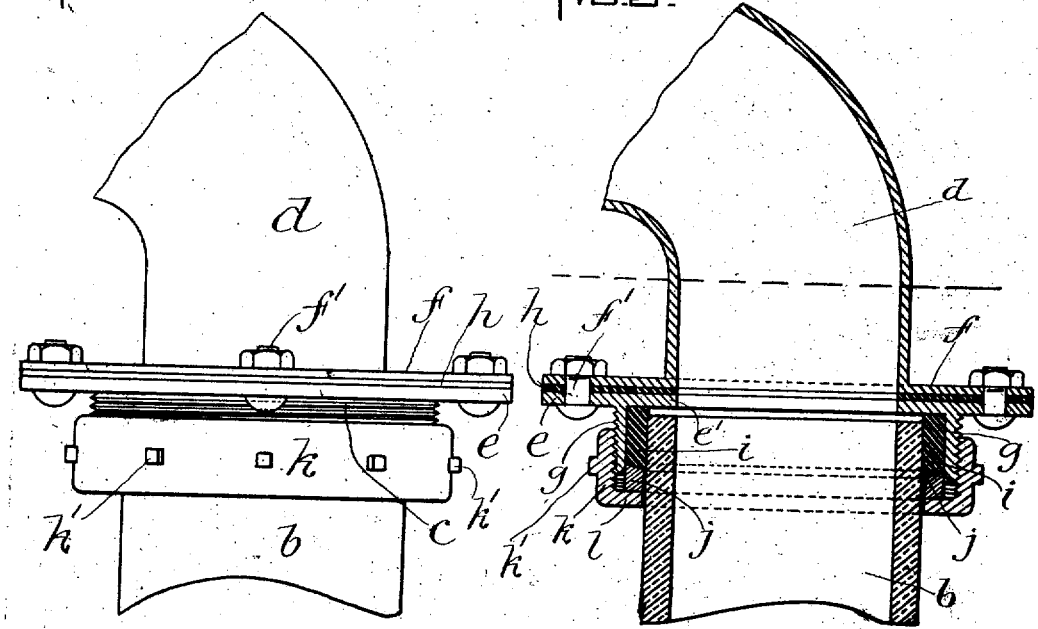
WITNESSES:
P. W. Pezzetti
Laurence E. Kennedy
INVENTOR
Peter F. Lyons
by Wright, Brown & Quinby
Attys

UNITED STATES PATENT OFFICE.

PETER F. LYONS, OF BOSTON, MASSACHUSETTS.

FLEXIBLE CONNECTION FOR WATER-CLOSETS, &c.

No. 853,515.　　Specification of Letters Patent.　　Patented May 14, 1907.

Application filed November 29, 1904. Serial No. 234,739.

*To all whom it may concern:*

Be it known that I, PETER F. LYONS, of Boston, in the county of Suffolk and State of Massachusetts, have invented certain new and useful Improvements in Flexible Connections for Water-Closets and the Like, of which the following is a specification.

This invention relates to water-closet bowls and the like, and has for its object to provide such a bowl with a union capable of joining the outlet pipe of the bowl, which is made of inelastic, brittle material, as porcelain, etc., with a rigidly-mounted pipe of tough material, such as iron, which will be yielding and flexible to permit of relative movement between the parts without breakage of the brittle material.

It frequently happens that when a closet bowl is set up and connected to the soil-pipe, it is either not squarely set on its support, or the pipe to which it is connected may run at such an angle that when the bowl is securely coupled thereto a portion of it is slightly raised from its support, or the support may not be sufficiently rigid, or from some other cause the bowl may be so positioned that when subjected to pressure under the ordinary conditions of use, it is caused to move slightly relatively to the pipe to which it is connected, with the immediate result of causing the portion of the outlet projection next the metal pipe to crack or break off short, producing a leak, to remedy which a new bowl must be substituted at a cost of some expense and more inconvenience.

By my invention I have provided a flexible connection for articles of this character which is capable of yielding under such conditions as those referred to so that the bowl may accommodate itself to the inequalities of its support without breaking the part to which the connection is joined.

The invention consists in the connection or coupling which I will now proceed to describe and claim.

Of the accompanying drawings forming a part of this specification, which show a preferred embodiment of my invention,—Figure 1 represents an elevation of a water-closet bowl as it appears when connected to the drain-pipe. Fig. 2 represents an elevation on an enlarged scale of the coupling. Fig. 3 represents a longitudinal section of the same.

The same reference characters indicate the same parts in all the figures.

The reference letter $a$ represents an ordinary water-closet bowl having an integral outlet-pipe or tubular stem $b$ made of porcelain or similar unyielding, brittle material. $d$ is the soil outlet-pipe leading to the plumbing system of the building, which is usually of metal and unyieldingly positioned, and $c$ is the connection between the two. This connection, as most clearly seen in Fig. 3, consists of a metal member having a flange $e$ which is bolted to the flange $f$ of the soil-pipe, an elastic gasket $h$ being interposed between the two to make a water- and gas-tight joint, and a screw-threaded tubular portion $g$ adapted to extend over the end of the outlet $b$, its internal diameter being considerably greater than the external diameter of the outlet.

Between the outlet $b$ and tubular part $g$ is interposed a packing-ring $i$ of rubber or other elastic or yielding composition and on the outside of the part $g$ is screwed a threaded annular nut $k$ which has an inwardly-projecting flange $l$ extending over the space occupied by the packing-ring and constituting the gland of the packing. A metal ring $j$ of a diameter and thickness such as to permit it to enter the space between the tubular part $g$ of the connection and the outlet $b$ loosely surrounding the latter, is interposed between the packing-ring and the flange $l$. The member $c$ also has an internal flange or shoulder $e'$ extending inwardly to cover the space occupied by the packing and which may extend also over the end of the outlet $b$, the whole constituting a connection which may be handled separately and may be slipped over the outlet projection of any bowl. After being so placed it may be securely fastened by screwing up the annular nut, which forces the ring or gland $j$ against the elastic packing, compressing the latter and causing it to bind against the inner surface of the tubular projection and the exterior of the outlet $b$ with a force depending on the amount by which the nut is screwed up.

The connection is usually located below the normal level of the water in the apparatus, indicated by the dotted line in Figs. 1 and 3, in order that in case the joint should not be made tight enough, any leakage may be immediately detected and remedied by tightening the nut.

It will be observed that this structure provides a connection which will prevent any leakage and which will yet be sufficiently yielding to permit some flexion between the bowl and the soil-pipe. When the parts are connected a space is left between the end of the outlet b and the flange e' to allow for enough yielding to compensate for whatever inaccuracy is ordinarily likely to occur in setting up the bowl in the first place or whatever distortion may take place later.

I do not limit myself to the exact details described, as minor changes may be made without departing from the spirit of the invention, or to the particular use in connection with which the device has been hereinbefore described, since such a flexible coupling is adapted to be employed in any relation in which two pipes are required to be joined flexibly and yet tightly.

I claim:—

1. The combination with a closet bowl having an integral tubular outlet stem above the base of the bowl and below the normal level of water therein, and a metallic outlet pipe, of a connection having a flange for rigid attachment with a similar flange on the pipe and provisions for making a flexible watertight connection with the outlet stem; said provisions consisting of a tubular member or flange surrounding the stem, an internal shoulder within said tubular flange, an elastic packing between said flange, shoulder and stem, and a gland threaded on the flange outside of the stem adapted to compress the elastic packing against the flange and shoulder and thereby cause it to press tightly and yieldingly against the outlet stem.

2. The combination of a closet bowl having an integral tubular outlet stem free from external projections; a metallic pipe abutting said outlet stem; and a yielding watertight connection uniting said pipe and stem located above the base of the bowl and below the normal level of water in the bowl, comprising a member having a flat annular flange connected to the metallic pipe, a tubular extension surrounding the end of the stem, an internal annular shoulder projecting across the end of the stem and separated therefrom; an elastic packing contained between said tubular member, the stem and the shoulder; a nut threaded on the exterior of said tubular member and formed with a flange projecting over the end of said tubular member and loosely surrounding said stem; and a rigid compression ring located between the stem, packing and nut and wholly inclosed thereby.

3. The combination of a closet bowl having an integral laterally and upwardly projecting tubular outlet stem free from external projections; a metallic pipe forming a continuation of said stem and extending laterally away therefrom; a lateral flange formed on the end of the metallic pipe; and a yielding water-tight connection between said pipe and said stem located above the base of the bowl and below the normal level of water in said bowl, comprising a tubular member provided with a lateral flange connected to the flange of the pipe and surrounding the end of the stem, having an internal annular shoulder projecting across the end of the stem and separated therefrom; an elastic packing contained between said tubular member, the stem and the shoulder; a nut threaded on the exterior of said tubular member and formed with a flange projecting over the end of said tubular member and loosely surrounding said stem; and a rigid compression ring located between the stem, packing and nut and wholly inclosed thereby.

4. An attachment for closet bowls and the like comprising a flat annular plate or ring having extending from one side intermediate its external and internal diameters an externally-threaded annular rib or tubular member, the portion of the plate external to said rib or member constituting a flange having provisions for attachment to a complemental abutment, and the internal portion constituting a packing shoulder, a nut or ring mounted externally on the tubular member in screw-threaded engagement therewith and formed with an internal flange forming a shoulder in line with the said packing shoulder, and an elastic annular packing ring contained within the tubular member an said shoulders and arranged to be compressed and distorted by adjustment toward each other of said shoulders.

In testimony whereof I have affixed my signature, in presence of two witnesses.

PETER F. LYONS.

Witnesses:
ROBERT L. BAKER,
ARTHUR H. BROWN.